US005726626A

United States Patent [19]

Jabbour et al.

[11] Patent Number: 5,726,626

[45] Date of Patent: Mar. 10, 1998

[54] WATERPROOF ACOUSTIC ALARM SAFETY DEVICE EMBODIED IN A WRISTWATCH

[75] Inventors: Saji Jabbour, Rances; Jacques Müller, Reconvilier; Laurent Pantet, Nods, all of Switzerland

[73] Assignee: SMH Management Services AG, Biel, Switzerland

[21] Appl. No.: 640,280

[22] Filed: Apr. 30, 1996

[30] Foreign Application Priority Data

May 3, 1995 [CH] Switzerland ........................ 01 257/95

[51] Int. Cl.[6] ........................ H04B 3/36

[52] U.S. Cl. ........................ 340/407.1; 368/245; 368/250; 368/291

[58] Field of Search ........................ 340/407.1, 825.46, 340/965, 384.6, 384.7, 387.1; 434/113; 368/230, 245, 283, 250, 291

[56] References Cited

U.S. PATENT DOCUMENTS

| | | | |
|---|---|---|---|
| 3,858,389 | 1/1975 | Isuruishi | 368/245 |
| 4,045,954 | 9/1977 | Ganter et al. | 368/291 |
| 4,167,849 | 9/1979 | Takahashi | 368/291 |
| 4,330,878 | 5/1982 | Nakamura | 368/250 |
| 4,374,624 | 2/1983 | Murata | 368/250 |
| 4,403,870 | 9/1983 | Thompson et al. | 368/291 |
| 4,459,039 | 7/1984 | Klingenberg | 368/291 |
| 5,467,325 | 11/1995 | Juillerat | 368/291 |

FOREIGN PATENT DOCUMENTS

| | | |
|---|---|---|
| 1359524 | 5/1963 | France . |
| 537033 | 6/1973 | Switzerland . |
| 559933 | 3/1975 | Switzerland . |
| 2267374 | 12/1993 | United Kingdom . |

OTHER PUBLICATIONS

Patent Abstracts of Japan, Sep. 6, 1980, vol. 4, No. 127 (P-26); & JP-A-55 080082, Jun. 16, 1980.

*Primary Examiner*—Jeffery Hofsass
*Assistant Examiner*—John Tweel, Jr.
*Attorney, Agent, or Firm*—Sughrue, Mion, Zinn, Macpeak & Seas, PLLC

[57] ABSTRACT

The invention concerns an acoustic alarm safety device comprising a case (2), a vibrating element (20) associated to a membrane (22) so as to make it vibrate, electrical means for providing a control signal to said vibrating element, and means (18) for actuating the electrical means.

This device is characterized in that it further comprises a pierced backcover (28) attached to said case (2) and arranged so as to protect it, and so as to allow a vibration of the set of the vibrating element-membrane (20, 22), said backcover being attached to said case in a manually removable manner, and a fitted ring (26) to which is attached said membrane (22), said ring (26) and said membrane (22) being associated to the case in such a way that the set ring-membrane (26, 22) ensures the waterproofness of the case (2).

11 Claims, 3 Drawing Sheets

WATERPROOF ACOUSTIC ALARM SAFETY DEVICE EMBODIED IN A WRISTWATCH

BACKGROUND OF THE INVENTION

The present invention concerns a waterproof acoustic alarm safety device. More particularly, this invention concerns an alarm safety device which is of small dimensions and which may be worn on the wrist of its user, for example, in the form of a wristwatch.

Nowadays, the security of persons has unfortunately become a preoccupying problem, particularly in city surroundings. In particular, people finding themselves alone in dark roads or in parking lots may have a strong feeling of being in danger. It is thus desirable to provide an acoustic alarm which is easily turned on and which is capable of providing a very loud sound so as to scare off any aggressor and to warn other people close by, so as to obtain an assistance as fast as possible.

Acoustic alarm safety devices are already known. In fact, document US-A-4 806 911 describes a portable alarm safety device realised in the form of a key-ring comprising a piezoelectric vibrator, an oscillator, a driving circuit to make vibrate the vibrator, and means for actuating the alarm. However, the disclosed device is not waterproof. Furthermore, the alarm cannot be easily actuated if the user has this device in his pocket.

Document GB-A-2 267 374 describes a portable acoustic alarm safety device, which is integrated into a jewellery piece, for example a wristwatch. The device also comprises a piezoelectric vibrator, an oscillator, a driving circuit to make vibrate the vibrator, and means for actuating the alarm. The fact that there is a loudspeaker provided on the visible side of the device deteriorates the aesthetic aspect of the device. Furthermore, the described wristwatch does not seem to be waterproof. In any case, there is no mention at all given concerning the construction of the device itself.

Furthermore, wristwatches comprising an acoustical alarm device are already known. However, this usually concerns wake-up alarm watches in which the sound level to be obtained is not comparable to that which is indispensable for a security device. For example, document GB-A-2 066 525 describes an alarm watch comprising a piezoelectric vibrator mounted on a metal membrane. The watch comprises a pierced backcover to allow for the vibration of the vibrator membrane set. The backcover is mounted in such a way that a volume of air exists between the membrane and the backcover itself. Thus, a resonance cavity is obtained which allows to obtain a resonance at the own frequency of the vibrator. The holes in the backcover allow the air and thus also the sound to escape. The efficiency is thus increased and a higher sound level may be obtained.

As the backcover of this wake-up alarm device is pierced, water and impurities carried by it and other polluting elements can enter the device thus facilitating the creation of bacteria in the resonance cavity. If these bacteria are not removed, that is if the device is not cleaned regularly, they may cause allergic reactions of the user. Furthermore, if the openings are blocked, the sound level produced by the alarm will be strongly reduced. It is thus necessary to be able to clean regularly and easily the backcover, as well as the openings arranged in the latter.

This phenomena of impurities formation and of the obstruction of the holes in the backcover is accentuated in safety devices, because of the fact that these are intended to be worn, by definition, almost permanently by the user, thus exposing them even more to polluting environments.

Furthermore, the consequences of a possible disfunctioning of this type of safety device are evidently much worse than for a wake-up device, because the correct or the wrong functioning of a safety device may have direct consequences on the security or the physical or moral integrity of its wearer in case of an aggression.

The natural response to this type of problem is to provide an arrangement which tries to avoid the penetration of water and impurities into the inside of the resonance cavity, by complex filters systems or by a reduction of the apertures arranged in the backcover.

However, these solutions do not satisfy in a cost effective manner nor in terms of the efficiency of the produced sound level.

SUMMARY OF THE INVENTION

An object of the present invention is to overcome these defaults and to provide a new solution of the clogging of the resonant cavity of an acoustic alarm safety device, which is portable and waterproof.

Thanks to the features of the invention, the wearer can easily and regularly clean his safety device without requiring a tool to do so. This allows him to clean his device for example under the shower or under a stream of water. Thus, the sound level of the alarm device can be assured by also cleaning the apertures thanks to the removable features of the backcover. Furthermore, the risk of damaging the backcover when removing it is thus avoided.

As the device stays completely intact when the backcover is removed, the waterproofness of the device is maintained. In fact, the backcover does not play any role in a waterproofness which is assured by the membrane of the vibrator.

Advantageously, the membrane is attached in such a way so as to allow to further increase the sound level of the alarm.

There will be described hereafter, byway of example, an embodiment of the object of the invention while referring to the annexed drawings in which:

DESCRIPTION OF A PREFERRED EMBODIMENT

Figure 1:
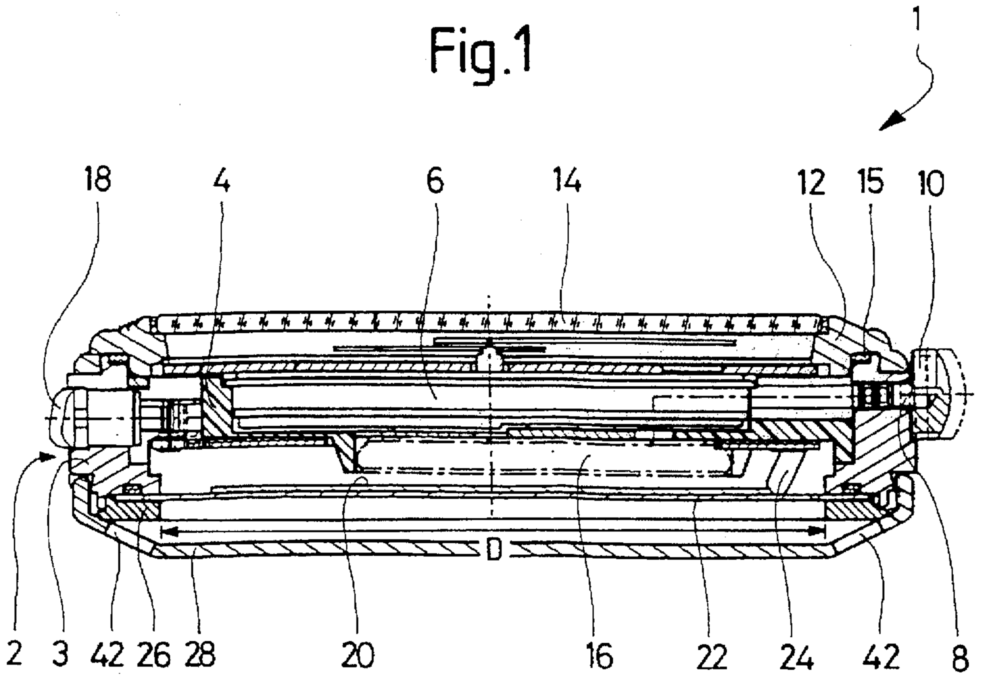
FIG. 1 is a cross section view representing in a schematical manner the alarm safety device according to the invention.
Figure 2:
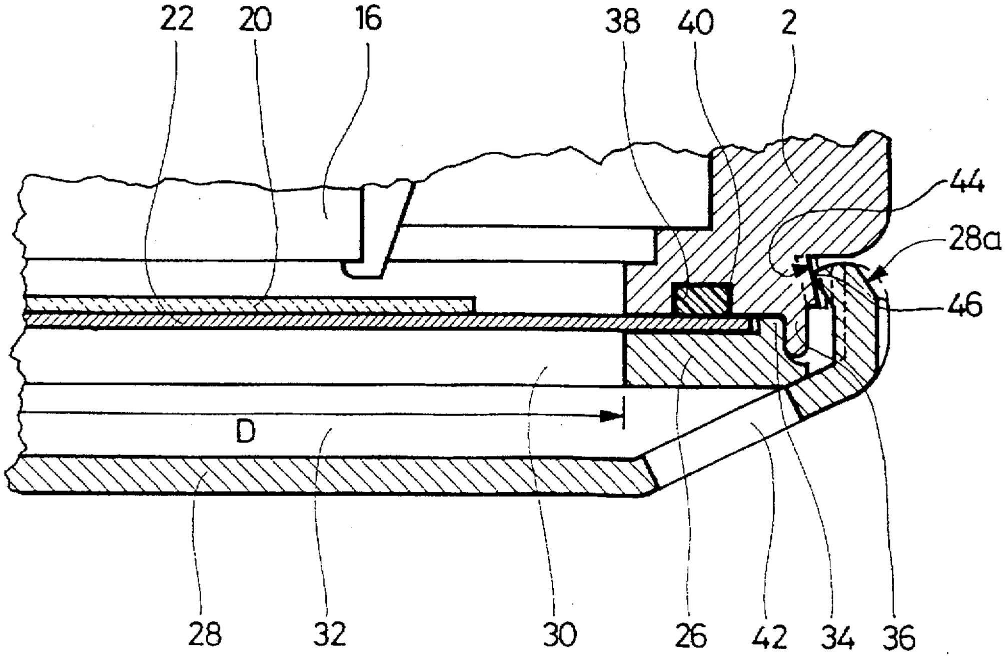
FIG. 2 is an enlarged view of FIG. 1, representing more particularly the attachment of the membrane carrying a piezoelectric vibrator and of the backcover on the case of the device.

Now referring to FIGS. 1 and 2, an acoustic alarm security device will be described hereafter, which has general reference 1.

The acoustic alarm safety device 1 is, in a non limitiveadvantageous embodiment, constituted by a timepiece, in particular a wristwatch comprising a case 2 comprising a middle 3 in the interior of which is located a fitting 4 which carries in a classical manner a watch movement 6, and a bezel 12 associated to a glass 14 mounted in a waterproof manner on middle 3. The principal functions of this movement may be controlled by a stem 8 which can slide and turn in the interior of case 2 and to which is attached a crown 10.

Watch movement 6 drives a set of display means, not referenced here, intended to be displaced over a dial carrying information.

This arrangement is rendered waterproof by the disposition of a waterproof gasket 15 interposed between a superior region of middle 3 and bezel 12. Bezel 12 is snap-fitted to middle 3.

Also, fitting 4 holds a supply battery 16 intended to supply an electronic circuit, not represented, also held by fitting 4 and the functioning of which may be controlled by a push-button 18 capable of actuating an electric contact providing a voltage to said electronic circuit.

This electronic circuit, not represented, is electrically connected to a piezoelectric vibrator 20 which is fixedly attached to a membrane 22 itself fixed, as will be explained hereafter, in a waterproof manner to the inferior region of case 2.

Thus, when push-button 18 is activated by the user of the safety device 1, the electronic circuit, not represented, provides by way of an electric contact or a clamp 24 a control signal for vibrationally driving the piezoelectric vibrator 20 and its associated membrane 22, at the resonance frequency. The electronic circuit may be arranged in such a way that push-button 18 must be activated twice in a row so as to avoid too easy turning on of vibrator 20 and thus of the sounding alarm. However, the device 1 may also comprise two identical push-buttons 18, situated for example at two o'clock and at eight o'clock on middle 3, which must be activated simultaneously to turn on the sounding alarm.

Advantageously, the electronic circuit is arranged in such a way that the disactivating of vibrator 20 is controlled by three consecutive activations of the push-button or of the push-buttons 18. In this way, the stopping of this sounding alarm cannot be easily executed by a possible aggressor.

The vibrating set formed by piezoelectric vibrator 20 and by membrane 22 is attached to middle 3 of case 2 by the intermediate of a fitted ring 26, while case 2 is closed at its base by a pierced backcover 28 which has the particularity of being removable and which may thus be easily removed by the user.

To this effect, reference will now be made to FIG. 2 which represents in a more detailed manner the assembly on case 2, on the one hand, of backcover 28, and on the other hand, of the vibrating set formed by vibrator 20 and membrane 22.

The fitted ring 26 is of an annular form and has in its center an axial aperture 30 which allows for a flexion displacement of membrane 22 caused by vibrator 20 so as to provide a sound due to the fact of its amplitude movement in a resonance cavity 32 formed by backcover 28.

This fitted ring 26 comprises on its circumference a shoulder 34 which is arranged so as to snap engage onto a cylindrical shoulder of inversed clearance 36 which extends outwardly from middle 3 with respect to its base. Furthermore, membrane 22 is located between ring 26 and case 2 and it will be noted that this ring is flattened at its superior surface against middle 3, under the influence of fitted ring 26. The positioning of shoulder 34 may also been adjusted so as to delimit an interior diameter which corresponds to the diameter of membrane 22. This membrane 22 can thus be clipsed or driven onto fitted ring 26.

Also, a waterproof gasket 38 formed by an elastic O-ring is located in a groove 40, and is crushed at the interior of this groove due to the fact that it is flattened against the superior surface of membrane 22. Thus, this forceful flattening of membrane 22 directly against middle 3, assures an excellent adherence maintenance of membrane 22 which is formed of a metallic material, for example of brass or of stainless steel. This forceful flattening of metallic membrane 22 against case 2 also ensures the waterproofness of case 2 with respect to the exterior thanks to the compression of gasket 38.

Advantageously, metallic membrane 22 is stuck to the ring 26 which is itself removable, thus allowing for, thanks to the snap assembling of ring 26, to replace the battery 16, then to put back into place membrane 22 and vibrator 20, during the reassembly, on the correct side with respect to clamp 24 thanks to the attachment of this membrane 22 to ring 26. Thus, there is no risk at all of inversely positioning vibrator 20 with respect to electric contact 24, which might of course have as a consequence to completely alter the functioning of the safety device.

As such, the sticking of membrane 22 onto ring 26 and the snap fitting of ring 26 to case 2 assures a positioning without any risk of error of vibrator 20 with respect to its electric contact 24, and thus ensures the functioning of the safety device following a disassembly and a reassembly.

It will therefore be understood, that an eventual assembling of membrane 22, and more particularly of vibrator 20, inversely onto case 2, and without any prior test by the user, might have dramatical consequences for the security of the user who, in case of aggression and after having pressed on the push-button 18 were to suddenly notice the non-functioning of his safety device.

Furthermore, it should be noted that backcover 28 comprises large apertures 42 (only two being represented here) allowing the sound created in the interior of the resonance cavity 32 to exit. This arrangement thus provides a very high sound level.

Thus, it will be understood that instead of preventing the penetration of water and any impurities into the interior of the resonance cavity, this entering is on the contrary facilitated, but also the evacuation thereof. On the other hand, there is advantageously provided a mechanical link between case 2 and backcover 28, such that backcover 28 may be very easily and regularly removed by the user, so that he may have access to the backsurface of metallic membrane 22 as well as to the interior of backcover 28 to ensure their cleaning.

There is thus provided a mechanical link between case 2 and backcover 28 such that backcover 28 may be removed without requiring a tool.

Free edge 28*a* of backcover 28 further comprises two bulges or swellings 46 diametrically opposed and radially extending towards the interior of backcover 28.

Figure 3:
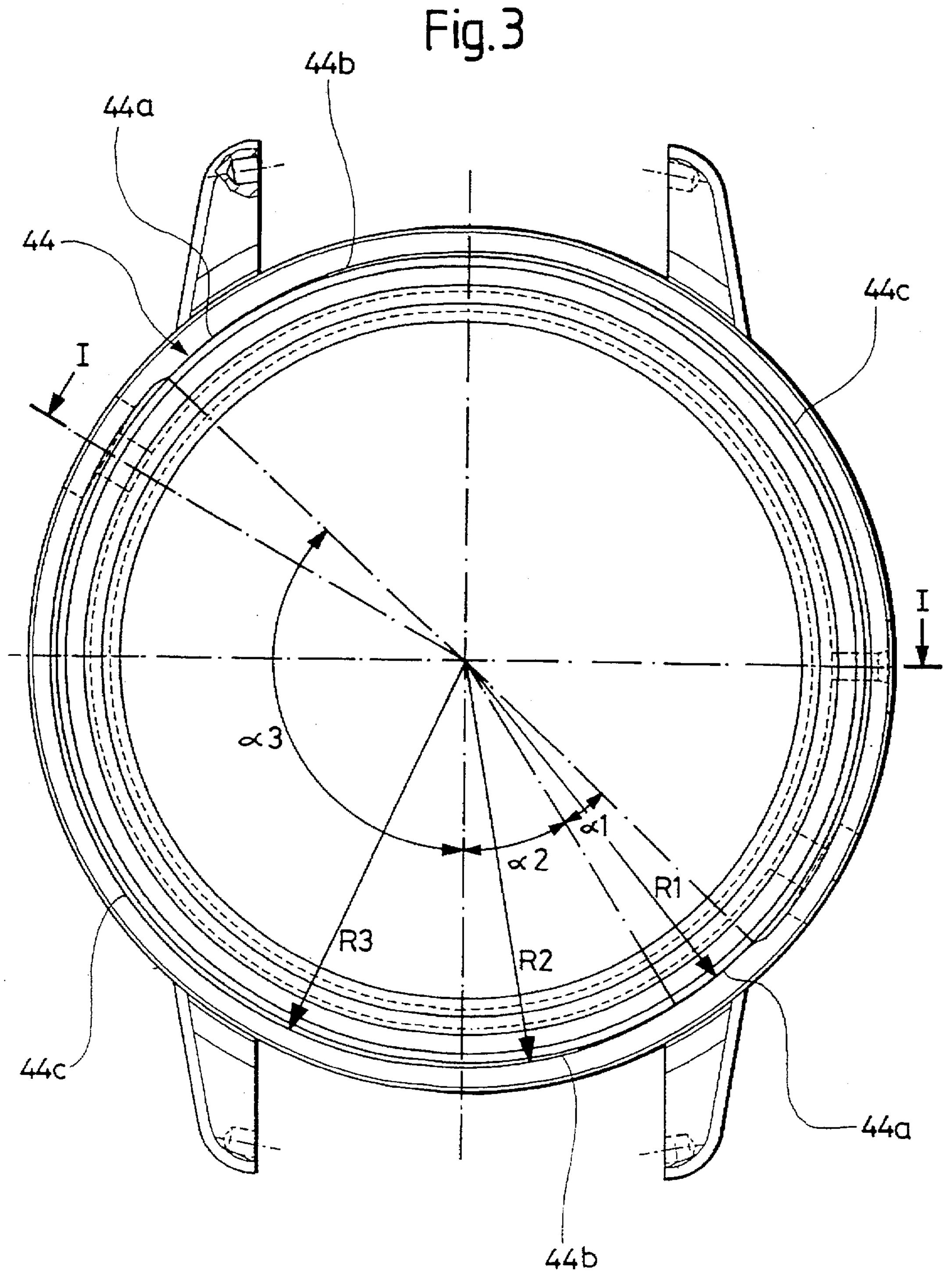
FIG. 3 is a bottom view of the case as represented in FIGS. 1 and 2.
Figure 4:
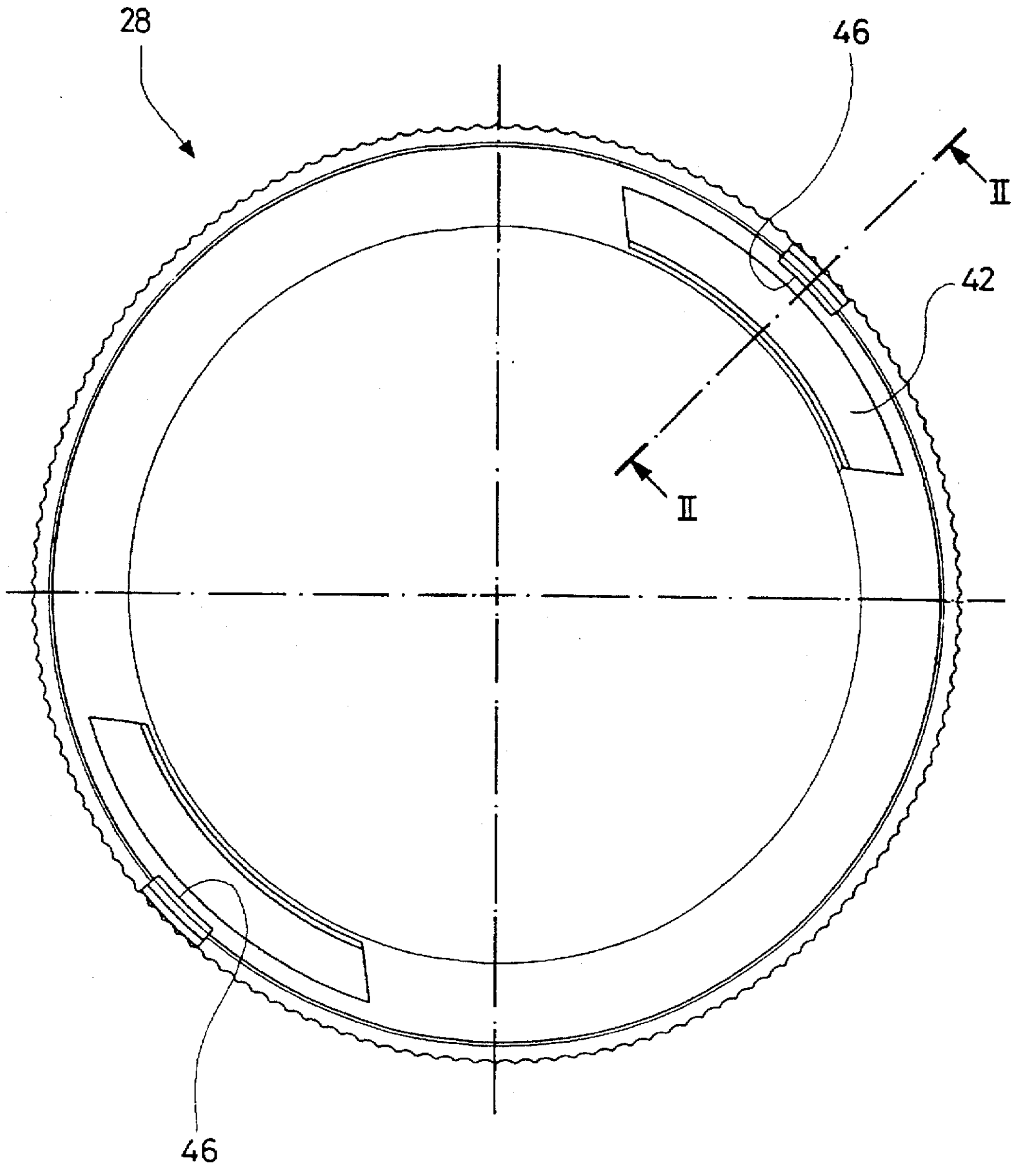
FIG. 4 is a top view of the backcover on its own represented in FIGS. 1 and 2.

As can be seen in FIG. 3, case 2 comprises at its base, that is at its interior region, and directly over shoulder 36 of middle 3, a lateral edge 44, of which two first regions 44*a*, which are diametrically opposed each extend along a first circular arch 51, and presents a first constant radius R1. These two first regions 44*a*, so called engagement regions, allow to assemble backcover 28, and in particular bulges or swellings 46, onto case 2, more specifically onto its edge 44.

This edge 44 further comprises two second regions 44*b* which are also diametrically opposed and which are each arranged respectively in the extension of the first region 44*a* in such a way that they are adjacent to the latter.

Each second region 44*b* extends along a second circular arch $\alpha 2$ and presents a second progressive radius R2.

Furthermore, edge 44 comprises two third regions 44*c* also diametrically opposed, and each arranged respectively in the extension of the second regions 44b in such a way that they are adjacent to the latter.

Each third region 44c extends along a third circular arch α3 and presents a third constant radius R3.

It may thus be understood that each intermediate region 44b constitutes a transition region between the regions 44a and 44c and that the radius R2 extends progressively along a circular arch α2 between the smallest radius R1 and the largest radius R3. The dimension of this progressive radius R2 is comprised between that of radius R1 and of radius R3.

With respect to region 44a, region 44b forms a matter of increased thickness which will provoke the jamming of backcover 28 by way of an external lateral action against the bulges or swellings 46.

It should further be specified that edge 44 presents along 360° an inverted clearance which contributes to assuring the forceful maintenance of backcover 28 onto case 2.

It should also be specified that bulges 46 are obtained by stamping the extremity of the free edge 28a of backcover 28. Thus, thanks to the transition region 44b, the bulges 46 undergo a radial force directed towards the exterior which block backcover 28 against case 2. The backcover can thus be manually removed from case 2 by a rotation in an opposite direction, and then be easily reassembled by the user. It should further be noted here that there is no waterproofness between backcover 28 and case 2, because this waterproofness is ensured by the set of ring 26/membrane 22 and middle 3 of case 2, by way of the waterproof gasket 38. However, it will be understood that a waterproof gasket may be introduced between the backcover and the middle if such were desirable, for example in the case where the backcover were not to be pierced.

It will thus also be understood that the attachment of membrane 22 to case 2 is of the setting type, because the exterior contour of membrane 22 is completely held prisoner between fitted ring 26 and middle 3 of case 2.

It should also be specified that with the set vibrator 20-membrane 22 which has a total thickness of 0.53 mm, of which the membrane represents a thickness of 0.25 mm and the vibrator a complementary thickness, that the Applicant has noticed that the described arrangement provided a very high sound level by dimensioning membrane 22 in such a way that its diameter D until the interior edge of fitted ring 26, that is the diameter of its free surface, was chosen between 29 and 31 mm. The Applicant further noticed that the best sound level could be obtained with a diameter equal to 30 mm; in this example the diameter of the membrane is 35 mm, and that of the vibrator 25 mm.

This result is surprising when considering the theory relative to the nodal method of attachment. According to this theory which is known to the skilled person, the extremities of the membrane should be free so as to obtain maximum amplitude of the membrane and thus a maximum sound level. However, as it is preferable to have a device of small dimensions, the way of attaching the membrane would implicate high costs, due to a complicated construction, and due to large dimensions which would further be harmfull to the aesthetics of the security device.

It will thus be understood from what is described above that the device according to the invention produces a very high sound level, a feature which may be assured by the user himself, thanks to the facility of the cleaning of the device.

Although only one embodiment of the present invention has been described, the invention is not limited to this specific construction, which is only given by way of a non-limitative example with respect to the object of the invention.

What is claimed is:

1. An acoustic alarm safety device comprising:

a substantially circular case wherein said case has a center, a thin membrane, a vibrating element associated to said membrane so as to make it vibrate, electric means for providing a control signal to said vibrating element; and means for actuating said electric means, wherein said device further comprises a substantially circular pierced backcover removably attached to an outer edge of said case and arranged so as to protect the case and so as to allow vibration of the vibrating element and membrane set, said backcover being rotatably attached to said case in a manually removable manner which does not require any tools, said case having, on an outer periphery thereof, two diametrically opposite, peripherally tapered grooves presenting a radius with respect to the center of the case, said back cover having, on an outer periphery thereof, two diametrically opposite bulges which extend radially inwardly with respect to the center of the case and which engage said grooves, respectively, to jam said backcover onto said case; and a fitted ring to which said membrane is attached, said ring and said membrane being fixed to said case in such a manner that the ring-membrane set assures the waterproofness of said case.

2. A safety device according to claim 1, wherein said membrane is flattened against said case by the fitted ring.

3. A safety device according to claim 1, wherein said ring is snap-fitted to said case.

4. A safety device according to claim 1, wherein a watertight gasket is located in a groove arranged in said case, said gasket being crushed within said groove and being flattened against the superior surface of said membrane.

5. A safety device according to claim 1, wherein said fitted ring is stuck to said membrane.

6. A safety device according to claim 5, wherein a diameter D of a free surface of said membrane is chosen between 29 and 31 mm.

7. A safety device according to claim 6, wherein the diameter D of the free surface of said membrane is 30 mm.

8. A timepiece comprising an acoustic alarm safety device according to claim 1.

9. A waterproof device comprising two elements forming respectively a case and a backcover wherein said case has a center, and wherein the first of said elements comprises in its interior region a lateral exterior edge comprising:

two first regions which are diametrically opposed and which extend along a first circular arch presenting a first constant radius with respect to the center of the case, and two second regions which are diametrically opposed and which are each arranged respectively in the extension of said first regions such that they are adjacent said first regions, and which are each extending along a second circular arch presenting a second progressive radius with respect to the center of the case, and two third regions, which are diametrically opposed and which are each arranged respectively in the extension of said second regions such that they are adjacent said second regions, and which each extend along a third circular arch presenting a third constant radius with respect to the center of the case, and in that said second element comprises a free edge comprising two bulges which are diametrically opposed and which extend radially towards the interior of said backcover, such that said second regions, which are formed of a matter of increased thickness, provoke the jamming of said backcover against said bulges.

10. A waterproof device according to claim 9, wherein said second progressive radius is comprised within the first radius and the third radius.

11. A safety device according to claim 2, wherein said ring is snap-fitted to said case.

* * * * *